US012341309B2

(12) United States Patent
Hatch et al.

(10) Patent No.: US 12,341,309 B2
(45) Date of Patent: Jun. 24, 2025

(54) CONNECTOR DEMATING TOOL WITH PARALLEL PLATES

(71) Applicant: Honeywell Federal Manufacturing & Technologies, LLC, Kansas City, MO (US)

(72) Inventors: Stephen McGarry Hatch, Blue Springs, MO (US); James Alexander Zandstra, Long Beach, CA (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 574 days.

(21) Appl. No.: 17/678,680

(22) Filed: Feb. 23, 2022

(65) Prior Publication Data

US 2023/0268705 A1 Aug. 24, 2023

(51) Int. Cl.

| | |
|---|---|
| ***B23P 19/00*** | (2006.01) |
| ***H01R 13/633*** | (2006.01) |
| ***H01R 13/635*** | (2006.01) |
| ***H01R 43/22*** | (2006.01) |
| ***H01R 43/26*** | (2006.01) |
| *H01R 43/20* | (2006.01) |

(52) U.S. Cl.

CPC ......... *H01R 43/26* (2013.01); *H01R 13/6335* (2013.01); *H01R 13/635* (2013.01); *H01R 43/22* (2013.01); *H01R 43/205* (2013.01)

(58) Field of Classification Search

CPC .............. H01R 13/6335; H01R 13/635; H01R 43/205; H01R 43/22; H01R 43/26

See application file for complete search history.

(56) References Cited

U.S. PATENT DOCUMENTS

| | | | | |
|---|---|---|---|---|
| 5,009,134 A | 4/1991 | Sorensen et al. | | |
| 5,222,420 A | 6/1993 | Sorensen et al. | | |
| 6,367,787 B1 | 4/2002 | Poole et al. | | |
| 6,585,243 B1 | 7/2003 | Li | | |
| 6,966,123 B1 * | 11/2005 | Rubino | B25B 5/06 | 33/770 |
| 7,954,794 B2 * | 6/2011 | Fuller | B25B 5/068 | 269/171.5 |
| 10,676,037 B2 * | 6/2020 | Schactman | F16B 2/12 | |

* cited by examiner

*Primary Examiner* — Paul D Kim
(74) *Attorney, Agent, or Firm* — Erise IP, P.A.

(57) ABSTRACT

Electrical connector assembly devices, systems, and methods including a demating device configured to separate a first connector and a second connector of an electrical connector assembly. The demating device includes a housing body, a drive assembly including: a drive lever, a trigger configured to push against the drive lever, a drive assembly rod, and a spring mounted around the drive assembly rod; and a demating assembly including: a movable plate having at least two sides, wherein each of the two sides includes at least two prongs; a stationary plate having at least two sides, wherein each of the two sides includes at least two prongs; and a rotary actuator configured to rotate the movable plate.

14 Claims, 4 Drawing Sheets

CONNECTOR DEMATING TOOL WITH PARALLEL PLATES

STATEMENT OF GOVERNMENTAL SUPPORT

This invention was made with governmental support under DE-NA0002839 awarded by the United States Department of Energy/National Nuclear Security Administration. The government has certain rights in the invention.

BACKGROUND

1. Field

Embodiments of the invention relate generally to demating connections. More specifically, embodiments of the present invention are directed to a device and system for demating electrical connector assemblies.

2. Related Art

Multi-pin connectors (MPCs) are widely used throughout the electronics industry to connect a relatively large number of electrical conductors. An MPC is generally formed of two connector portions. One portion of the MPC is a male portion having a plurality of projecting electrical pins aligned in a predetermined pattern, such as rows or concentric circles. The pins individually connect through a body of the connector portion to lead wires. The other portion of the MPC is a female portion having a plurality of sockets or receptacles located in corresponding positions to receive the pins of the male portion. The sockets also individually connect to lead wires through the body of the female connector portion. When the two MPC portions are connected and the pins of the male portion are inserted into the corresponding sockets of the female portion, an electrical connection through the pins and sockets establishes continuous electrical conductivity between the lead wires attached to the MPC portions.

One of the common uses of MPCs is for the connection of circuit boards to other electronic equipment. In this situation, components on the circuit board are connected to the lead wires of one portion of the MPC. The lead wires of the other portion of the MPC are connected to other electronic equipment. Electrical power is supplied to the circuit board and signals are conducted to or from the circuit board through the lead wires and the connected MPC portions. If a component on the circuit board fails or the entire circuit board fails, it is convenient to disconnect the MPC portions and replace the circuit board and MPC portion attached to the faulty circuit board, rather than disconnect each lead wire from the faulty circuit board and then reconnect each lead wire to a new circuit board. The use of MPCs in this way results in efficient and convenient replacement of the failed electrical equipment. Traditionally, MPC portions have been separated and connected by hand. In separating or connecting the MPC, the user may grasp both portions of the MPC with his or her fingers and forcibly separate or connect the two MPC portions. However, small MPC connector portions with a large number of small pins and small sockets are difficult to align when connecting and separating them by hand.

Failure to maintain proper alignment of the MPC portions when separating them can damage the pins, sockets, or lead wires. Pins on the MPC can be bent or broken if the user mis-aligns, twists, or bends each MPC portion relative to the other when separating them. Misalignment occurs when any of the pins are offset in any direction from their intended sockets. If misalignment occurs, the pin or pins that are not matched with sockets bend over or break.

Twisting results from the user bending each portion of the MPC relative to the other portion during the separation of the portions. Twisting occurs relatively easily, and can break or bend the pins, thereby damaging the male MPC portion and rendering it useless. Lead wire breakage can also occur during separation. Often, the user grasps the lead wires because the bodies of the MPC portions are small or difficult to manipulate. Fatigue stress from repeated tension, torsion and compression forces on the lead wires caused by manually gripping the lead wires while connecting and disconnecting the MPC frequently results in broken lead wires. Lead wire failure may be difficult to detect because the insulation covering the lead wires obscures the break in the internal conductor.

Thus, there is a need for a reliable tool that will evenly demate MPCs, or other electrical connections with delicate connections, without twisting or damaging the MPCs. Additionally, there is a need for a tool that utilizes removably attachable demating plates, providing for a single, reusable tool that may be used in a variety of applications and with a variety of different sized electrical connector assemblies.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the techniques described herein relate to a demating device configured to separate a first connector and a second connector of an electrical connector assembly, the demating device including: a housing body; a drive assembly including: a drive lever, a trigger configured to push against the drive lever, a drive assembly rod, and a spring mounted around the drive assembly rod; and a demating assembly including: a longitudinal movable plate having a first side and a second side, wherein each of the first side and the second side includes at least one prong configured to engage the first connector or the second connector; a stationary plate having a first side and a second side, wherein each of the first side and the second side includes at least one prong configured to engage the first connector or the second connector; and wherein a rotary actuator is configured to rotate the movable plate and the stationary plate, and wherein the drive assembly is configured to move the movable plate away from the stationary plate in a first longitudinal direction.

In some aspects, the techniques described herein relate to a demating device, wherein the first side of the movable plate includes a first prong configuration, and the second side of the movable plate includes a second prong configuration, wherein the first prong configuration and the second prong configuration are different.

In some aspects, the techniques described herein relate to a demating device, wherein the first side of the stationary plate includes a third prong configuration, and the second side of the stationary plate includes a fourth prong configuration, wherein the third prong configuration and the fourth prong configuration are different.

In some aspects, the techniques described herein relate to a demating device, wherein the first prong configuration is compatible with the third prong configuration and the second prong configuration is compatible with the fourth prong configuration.

In some aspects, the techniques described herein relate to a demating device, wherein the first prong configuration and the second prong configuration are configured to fit different electrical connector assemblies.

In some aspects, the techniques described herein relate to a demating device, further including a coupling pin connecting and aligning the movable plate and the stationary plate together.

In some aspects, the techniques described herein relate to a demating device, wherein each of the movable plate and the stationary plate are non-uniform in thickness and further include a raised portion.

In some aspects, the techniques described herein relate to a demating system configured to separate a first connector and a second connector of a first electrical connector assembly, or configured to separate a third connector and a fourth connector of a second electrical connector assembly, the demating system including: a housing body; a drive assembly including: a drive lever, a trigger configured to push against the drive lever, a drive assembly rod, and a spring mounted around the drive assembly rod; and a demating assembly including: a first set of removably attachable demating plates, including: a first movable plate having at least two prongs configured to engage the first connector or the second connector, and a first stationary plate having at least two prongs configured to engage the first connector or the second connector; and a second set of removably attachable demating plates, including: a second movable plate having at least two prongs configured to engage the third connector or the fourth connector, and a second stationary plate having at least two prongs configured to engage the third connector or the fourth connector, wherein the demating assembly is configured to accept the first set of removably attachable demating plates or the second set of removably attachable demating plates at one time, and wherein the drive assembly is configured to move the first movable plate away from the first stationary plate in a first longitudinal direction, and to move the second movable plate away from the second stationary plate in the first longitudinal direction.

In some aspects, the techniques described herein relate to a demating system, wherein each of the first movable plate and the first stationary plate include a generally square perimeter.

In some aspects, the techniques described herein relate to a demating system, wherein each of the first stationary plate and the first movable plate include eight demating prongs.

In some aspects, the techniques described herein relate to a demating system, wherein each of the second movable plate and the second stationary plate include a generally pentagonal perimeter.

In some aspects, the techniques described herein relate to a demating system, wherein each of the second movable plate and the second stationary plate include five demating prongs.

In some aspects, the techniques described herein relate to a demating system, further including a rotary actuator configured to the first set of removably attachable demating plates and the second set of removably attachable demating plates.

In some aspects, the techniques described herein relate to a demating system, wherein a first side of the first movable plate includes a first prong configuration, and a second side of the first movable plate includes a second prong configuration, wherein the first prong configuration and the second prong configuration are different.

In some aspects, the techniques described herein relate to a method for demating an electrical connector assembly having a first connector and a second connector connected along a longitudinal axis, the method including: providing a demating tool including a movable plate, a stationary plate, and a drive assembly; inserting a first side of the movable plate and a first side of the stationary plate in a space between the first connector and the second connector, wherein a portion of the stationary plate engages an inner surface of the first connector and a portion of the movable plate engages an inner surface of the second connector; actuating the drive assembly to move the movable plate away from the stationary plate in a first direction, wherein the first direction is substantially parallel to the longitudinal axis; wherein the movable plate presses against the second connector and moves the second connector away from the stationary plate in the first direction; and demating the first connector and the second connector.

In some aspects, the techniques described herein relate to a method, further including: squeezing a trigger of the demating tool a first time to move the movable plate a first predetermined distance.

In some aspects, the techniques described herein relate to a method, further including: squeezing the trigger of the demating tool a second time to move the movable plate a second predetermined distance.

In some aspects, the techniques described herein relate to a method, further including: upon relieving a pressure applied to the trigger, the movable plate returns to an original position.

In some aspects, the techniques described herein relate to a method, wherein the movable plate and the stationary plate include a set of prongs on each side thereof, further including: rotating the movable plate and the stationary plate; and inserting a second side of the movable plate and a second side of the stationary plate in a space between the first connector and the second connector.

In some aspects, the techniques described herein relate to a method, further including: replacing the movable plate and the stationary plate with a second set of plates including a secondary movable plate and a secondary stationary plate having prongs with a different configuration.

BRIEF DESCRIPTION OF THE DRAWING FIGURES

Embodiments of the invention are described in detail below with reference to the attached drawing figures, wherein.

Figure 1:
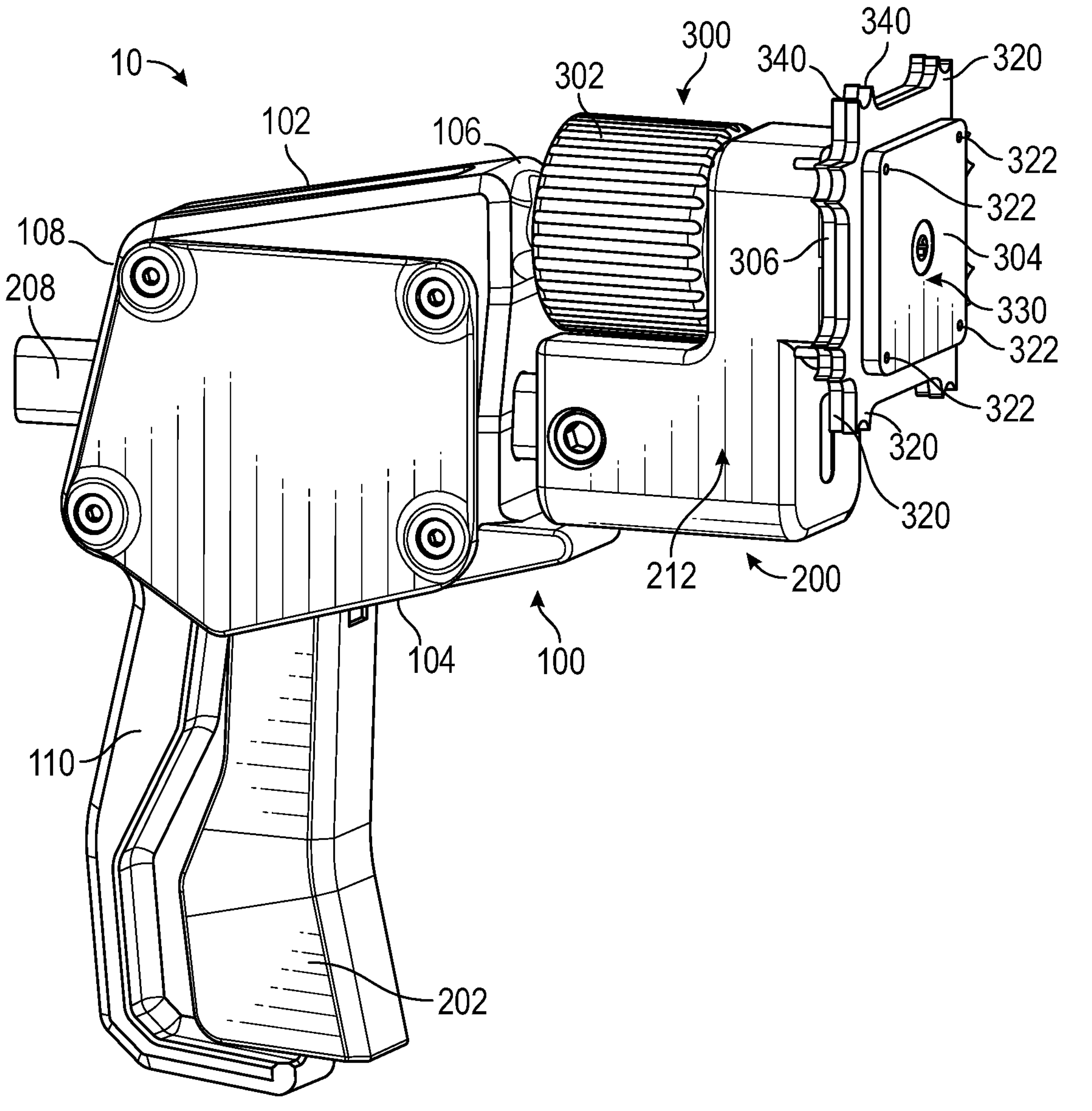
FIG. 1 is a side perspective view of a demating device in accordance with some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Demating, as used herein, is the process of separating or disconnecting an electrical connector assembly, the operation of which results in disconnection of the plug and socket and the pins and corresponding receptacles therein. Accordingly, the term demating may be interchangeably replaced with separating or disconnecting. Damage to one or more of the pins or receptacles can result from improper demating techniques. For example, uneven demating occurs when a side load is caused to be introduced in the connector, and particularly within the pins and/or receptacles, due to misalignment of the connector portions. Proper, parallel demating can provide advantages, such as minimal or zero side loading of the pins and receptacles during a demating event.

Broadly, embodiments of the present invention are directed to an electrical connection assembly demating device 10. Demating device 10 may be a hand-held, hand-operated tool for demating electrical connector assemblies. In some embodiments, and as described in greater detail herein, demating device 10 may comprise two parallel demating plates, a stationary plate and a movable plate, comprising prongs, which may be inserted between the spacing of a male connector and a female connector. Upon actuation of demating device, the movable plate may move away from the stationary plate, applying force to one of the connectors until separation occurs. Through such parallel demating, minimal or zero side loading of the pins and receptacles occurs during the demating process.

Figure 2:
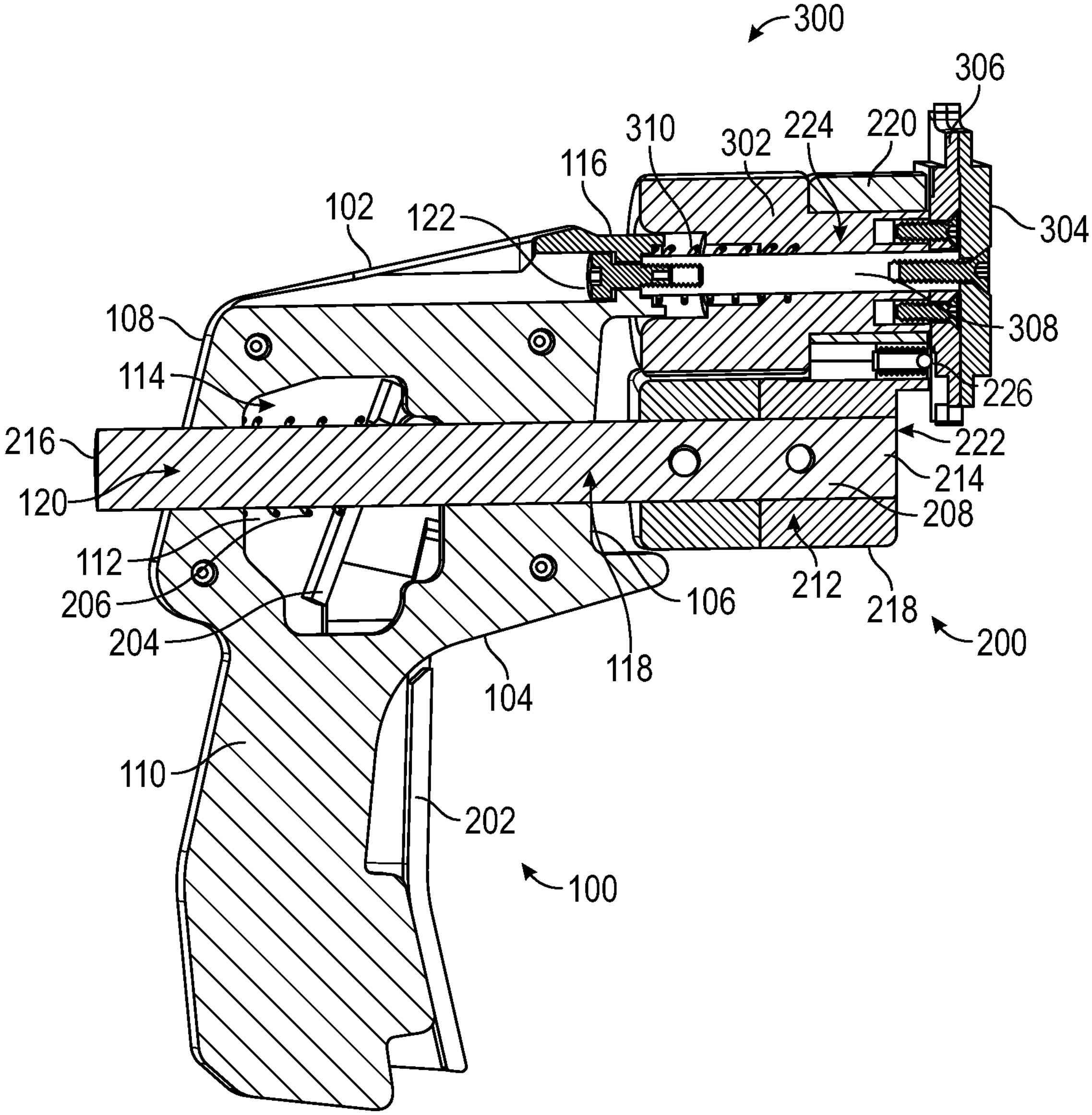
FIG. 2, is a cross-sectional view of a demating device in accordance with some embodiments.
Figure 3:
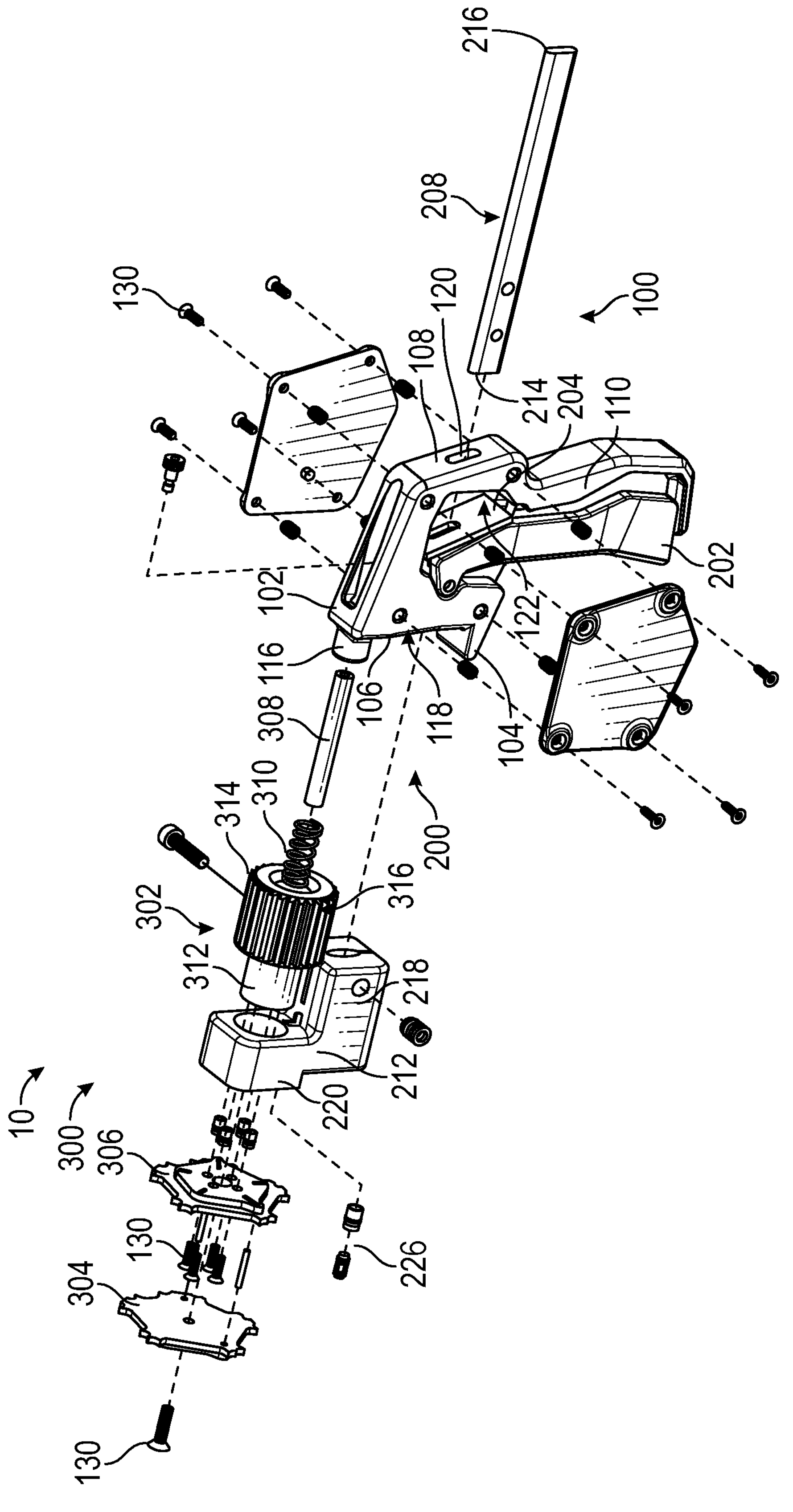
FIG. 3, is an expanded view of a demating device in accordance with some embodiments.

Turning now to the figures, exemplary embodiments of demating device are depicted and illustrated. Specifically, FIGS. 1-4 generally depict the components and parts of demating device 10 in exemplary embodiments with: FIG. 1 providing a side perspective view of demating device 10; FIG. 2 providing a cross-sectional of demating device 10; FIG. 3 providing an expanded view depicting the individual parts and components of demating device 10; and FIG. 4 providing a magnified view depicting the plates of demating device 10. FIG. 5 depicts an exemplary embodiment of demating device 10 used to demate an electrical connector assembly.

In some embodiments, demating device 10 may comprise a housing body 100, a drive assembly 200, and a demating assembly 300. As described in greater detail below, actuation of demating device 10 causes a separation between two demating plates of demating assembly 300, thereby demating two connectors of an electrical connector assembly. Further, the demating process may be a parallel demating, preventing twisting or unalignment of the electrical connectors. Further, demating device 10 may further comprise a return feature, returning demating device 10 to an original position after the demating process. Even further, and as described in greater detail below, the demating plates of demating assembly 300 may be removable plates, wherein particular demating plates may be designed for compatibility with specific electrical connector assemblies. Accordingly, the demating plates of demating assembly 300 may be configured to fit with or match different sized electrical connector assemblies. For example, in some embodiments, demating device 10 may be configured to demate a 5-pin connector. In further embodiments, demating device 10 may be configured to demate a 1-pin connector, a 2-pin connector, a 3-pin connector, a 4-pin connector, a 5-pin connector, a 6-pin connector, or a 7-pin connector. However, it will be appreciated, demating device 10 may be configured to demate any design, shape, or size of electrical connector assemblies.

In some embodiments, elements of demating device 10 may comprise a rigid and/or solid material, including for example a metal material, a hard plastic material, a rubber material, or any other material capable of maintaining form and shape under application and use of demating device 10, including any combination thereof. In some embodiments, elements of the demating device 10 may comprise polyetherketone. For example, elements of demating assembly 300 may be made from a hard plastic, and elements of housing body 100 and drive assembly 200 may be made from a metal material. In some embodiments, the elements of demating device 10 may be machined or formed using traditional methods of manufacturing mass-produced parts or components. Additionally, in some embodiments, elements of demating device 10 may be made or formed using an additive manufacturing process, such as fused filament fabrication or direct metal laser sintering. Further, the material used to manufacture or make elements of demating device 10 may be a non-conductive material, which may provide safety to a user during demating of electrical connector assemblies, or Electro-Static-Dissipative (ESD) material(s), which may provide protection to ESD sensitive components in surrounding assemblies, or a combination of these materials. However, it will be appreciated that elements of demating device 10 may be made or created during any currently known or yet to be discovered manufacturing techniques.

Turning now to FIGS. 1-4, in some embodiments, housing body 100 may comprise a grip-like design, similar to that of a pistol type firearm or tool, providing for a gripping and receiving area for a user or operator. For example, housing body 100 may comprise a top edge 102, a bottom edge 104, a front edge 106, and a rear edge 108. Further, housing body 100 may additionally comprise a handle 110, disposed near the intersection of bottom edge 104 and rear edge 108. Handle 110 may comprise a contoured grip, providing for a surface engagement area for receiving the hand of a user or operator. In other words, in some embodiments, housing body 100 may resemble the proximal end of a pistol style firearm, providing for a receiving area for a hand. In addition to providing a receiving area for the hand of an operator or user, housing body 100 may further provide attachment positions for other elements or components of demating device 10. For example, in some embodiments, housing body 100 may comprise one or more openings or void spaces, which may reduce the material required for forming housing body 100 or to make accessing parts or components located within the interior of housing body 100 easier. Such openings or void spaces may be covered by one or more coverings 112, providing protection to the interior of housing body 100 and the components therein. Coverings 112 may be made or manufactured from the materials described above and may be secured to housing body 100 through one or more mechanical fasteners 130. As used herein, mechanical fasteners 130 may be screws, bolts, clamps or other known mechanical fastening apparatus, including washers, nuts, or other pieces that are compatible with a specific type of mechanical fasteners.

Housing body 100 may further comprise one or more recesses, grooves, or channels, providing space or pathways for additional elements of demating device 10. For example, in some embodiments housing body 100 may comprise a drive assembly rod channel 114, defined by openings or holes present in front edge 106 and rear edge 108. Drive assembly rod channel 114 may provide a channel or a pathway for an element of drive assembly 200 to pass through housing body 100, providing the actuation of demating device 10. Further, housing body 100 may further comprise an opening located near the intersection of top edge 102 and front edge 106, providing to an attachment point for an element of demating assembly 300. Even further, housing body 100 may comprise a recess or channel located in a part of handle 110, providing an area for actuation of drive assembly 200, as described in greater detail below. In some embodiments, housing body 100 may further comprise or one or more protrusions, embossments, or extensions extending from housing body 100, which may provide receiving points for one or more elements of drive assembly 200 and/or demating assembly 300. For example, in some embodiments, housing body 100 may comprise a connection rod protrusion 116.

Continuing with FIGS. 1-3, in some embodiments, drive assembly 200 may provide the actuation system of actuating demating device 10 for demating electrical connector assemblies. For example, drive assembly 200 may comprise a trigger 202, a lever 204, a drive assembly spring 206, a drive assembly rod 208, and a plate housing 212. Trigger 202, may provide the contact point for an operator for activating the actuation effect of demating device 10, providing for a receiving surface between the actuation mechanism and the operator or user. In some embodiments, trigger 202 may be pivotally mounted to housing body 100, through a pivot mounted fastening mechanism. For example, trigger 202 may be placed within the recess or groove located in handle 110, with a portion of trigger 202 located within the interior of housing body 100. For example, a top portion of trigger 202 may be located within the interior of housing body 100, and a mechanical fastener 130 may be used to pivotally attach trigger 202 to housing body 100. Accordingly, a mechanical fastener 130 may secure trigger 202 to housing body 100, while still allowing trigger 202 to pivot for an actuation effect. In some embodiments, the length and width of trigger 202 may vary, and for example, may extend the length and width of the approximate dimensions of the recess of handle 110 or may be as small or as narrow as to provide for a sufficient surface area for a finger of an operator.

Further, drive assembly 200 may comprise an actuation or drive mechanism coupled to trigger 202. In some embodiments, trigger 202 may be operatively coupled to a drive assembly rod 208 through a lever 204 and drive assembly spring 206. As depicted in FIG. 2, drive assembly rod 208 may be positionally located within the interior of housing body 100 and may extend past the dimensions of housing body 100. For example, drive assembly rod 208 may comprise a distal end 214 and a proximal end 216. Drive assembly rod 208 may be positionally located such that distal end 214 may extend past front edge opening 118 and proximal end 216 may extend past rear edge opening 120. In some embodiments, drive assembly rod 208 may be located in drive assembly rod channel 114, and move within drive assembly rod channel 114 during actuation.

In some embodiments, lever 204 may be positionally located within housing body 100, and comprise a central hole or opening, such that lever 204 may be suspended to, and surround, drive assembly rod 208 allowing for drive assembly rod 208 to move longitudinally within the interior of housing body 100. Further, drive assembly spring 206 may be mounted around drive assembly rod 208 near the proximal end 216 of drive assembly rod 208 and between lever 204 and rear edge opening 120. The dimensions of drive assembly spring 206 may be larger than the dimensions of rear edge opening 120 to prevent drive assembly spring 206 from passing through rear edge opening 120. When trigger 202 is actuated, drive assembly rod 208 may be acted upon to move towards rear edge opening 120 and press against drive assembly spring 206.

In operation, trigger 202 is pivoted towards handle 110, thereby pushing lever 204 from an original position to an actuation position. Trigger 202 frictionally engages with drive assembly rod 208 and presses drive assembly rod 208 against drive assembly spring 206 and towards rear edge opening 120. In some embodiments, the distance that drive assembly rod 208 travels may be proportionally related to a squeeze of trigger 202. For example, for each complete squeeze of trigger 202, drive assembly rod 208 may be moved by about 0.15 inches. However, manipulations in the size and/or angle of lever 204 may modify the travel distance of drive assembly rod 208. For example, through such modifications, the distance that drive assembly rod 208 may travel per squeeze of trigger 202 may be about 0.05 inches to about 0.5 inches. Further, demating device 10 may comprise a self-reloading feature for returning drive assembly rod 208 and other components back to their original positions after actuation. For example, as drive assembly rod 208 is pushed back during actuation, force may be stored in drive assembly spring 206. As pressure is relieved on trigger 202, the stored force in drive assembly spring 206 may release, transferring energy back towards lever 204. In turn, drive assembly rod 208 may be moved towards front edge opening 118 and the original position of drive assembly rod 208.

Near or at distal end 214 of drive assembly rod 208, drive assembly 200 may comprise plate housing 212, which may provide a contact and securement point for one or more demating plates of demating assembly 300. In some embodiments, plate housing 212 may comprise a generally "L" shaped configuration, having a longitudinal portion 218 and a upright portion 220, with the portions oriented with respect to drive assembly rod 208. However, it will be appreciated that other geometric shapes and designs are contemplated for plate housing 212. As depicted in FIGS. 1-3, in some embodiments, longitudinal portion 218 may comprise a rod opening 222, providing an opening or void space allowing a portion of drive assembly rod 208 to traverse and enter into longitudinal portion 218. For example, distal end 214 of drive assembly rod 208 may enter into rod opening 222, thereby joining plate housing 212 to the remaining portions of drive assembly 200. Further, after drive assembly rod 208 has been inserted into longitudinal portion 218, drive assembly rod 208 and longitudinal portion 218 may be secured together. Even further, upright portion 220 may comprise a rotary opening 224 for accepting one or more components of demating assembly 300, which is described in greater detail below. In some embodiments, rotary opening 224 may be a substantially circular opening, configured for accepting a geometrically circular component of demating assembly 300.

In some embodiments, plate housing 212 may be removably attached to drive assembly rod 208, providing for the selective removal of plate housing 212 from drive assembly 200. For example, longitudinal portion 218 may comprise one or more void spaces or openings configured for receiving one or more mechanical fasteners 130. Further, drive assembly rod 208 may comprise corresponding void spaces or openings, such that a mechanical fastener 130 may enter through the void spaces located in longitudinal portion 218 and drive assembly rod 208, thereby coupling plate housing 212 to drive assembly rod 208. As described in greater detail below, in some embodiments, demating device 10 may comprise interchangeable sized demating plates, which may be used to demate electrical connectors of varying sizes without replacing demating device 10 itself. In some embodiments, plate housing 212 may comprise varying sizes that correspond to a particular size, or range of sizes, of the demating plates. Accordingly, a selectively removable plate housing 212 may aid in the customization options of demating device 10. However, in alternate embodiments, plate housing 212 may be permanently affixed to drive assembly rod 208 and irremovable. For example, longitudinal portion 218 may be permanently affixed to drive assembly rod through means, such as welding or adhesives.

Through coupling with drive assembly rod 208, plate housing 212 may likewise move from an original position to a second position towards housing body 100 during actuation of demating device 10. Likewise, upon the release of tension in drive assembly 200 and as drive assembly spring 206 returns trigger 202 to its original position, drive assembly rod 208 may return plate housing 212 to its original position.

In some embodiments, drive assembly 200 may further comprise at least one spring plunger 226 located on upright portion 220. In some embodiments, spring plunger 226 may be placed in and secured in a pre-drilled, pre-defined void, or hole in upright portion 220. Specifically, spring plunger 226 may be located at the distal end of upright portion 220 and may be positioned adjacent to the demating plates of demating assembly 300. Spring plunger 226 may therefore prevent direct contact between the demating plates of demating assembly 300 and upright portion 220. In some embodiments, spring plunger 226 may aid in aligning of at least one of the demating plates. Further, in some embodiments, spring plunger 226 may aid in reducing or eliminating friction between upright portion 220 and demating plates, increasing the lifetime of the demating plates.

In some embodiments, demating device 10 may further comprise a demating assembly 300 configured for demating electrical connector assemblies. For example, and as depicted in FIGS. 1-4, demating assembly 300 may comprise a rotary actuator 302, a stationary plate 304, and a movable plate 306. Additionally, in some embodiments, demating assembly 300 may further comprise a connection rod 308 that may be used to secure stationary plate 304 in place and a demating assembly spring 310 to return rotary actuator 302 to an original position after actuation. As depicted, in some embodiments, rotary actuator 302 may comprise a generally cylindrical design, providing for a rotary effect, such that through manipulation, rotary actuator 302 may rotate in a 360-degree manner around a center axis. As described in greater detail below, the rotary effect of rotary actuator 302 may be used to rotate stationary plate 304 and/or movable plate 306 to adjust for electrical connector assemblies of different designs and/or orientations. Accordingly, with exchangeable demating plates of customizable sizes, shapes, and dimensions, a single demating device 10 may be used in a variety of settings and applications through selection of the desired demating plates. Further, in some embodiments, rotary actuator 302 may comprise at least two sections of varying sizes and surface textures. For example, as depicted, rotary actuator 302 may comprise a distal end 312 and a proximal end 314, corresponding to the distal end 214 and proximal end 216 of drive assembly rod 208. In some embodiments, distal end 312 may have a smaller diameter, circumference, and or dimensions than proximal end 314. As depicted, the smaller dimensions of distal end 312 may provide for placement of distal end 312 into a portion of plate housing 212, through the insertion of distal end 312 into rotary opening 224. Distal end 312 may be inserted into rotary opening 224 until a distal part of proximal end 314 comes into contact with rotary opening 224. Because of its larger dimensions, proximal end 314 may provide a block or ending point of insertion, preventing any further insertion of rotary actuator 302 into rotary opening 224. As further depicted, in some embodiments, proximal end 314 may further comprise a textured surface area 316 covering a predetermined percentage of the surface area of proximal end 314. For example, textured surface area 316 may be located around the entire outer perimeter surface area of proximal end 314. In further embodiments, textured surface area 316 may be selectively placed at intermittent positions on proximal end 314. Textured surface area 316 may provide a gripping effect, aiding in the rotation of rotary actuator 302 to rotate the position of stationary plate 304 and/or movable plate 306.

In some embodiments, rotary actuator 302 may comprise a hollow design, such that connection rod 308 and demating assembly spring 310 may be housed or located at least partially within the dimensions of rotary actuator 302. In some embodiments, connection rod 308 may be coupled or secured to housing body 100 using a mechanical fastener 130 at connection rod protrusion 116. For example, connection rod 308 may be secured by a mechanical fastener 130 to connection rod protrusion 116 located near a junction at top edge 102 and front edge 106. Connection rod protrusion 116 may comprise an opening, hole, or void space at this location for the accepting of the mechanical fastener 130. For example, a mechanical fastener 130 may be a screw that can be inserted into a connection rod opening 122 and threaded into one end of connection rod 308, thereby coupling connection rod 308 to housing body 100, and rendering connection rod 308 as immovable and stationary. Further, after placement and securement of connection rod 308, demating assembly spring 310 may be placed around connection rod 308. After both connection rod 308 and demating assembly spring 310 are placed, rotary actuator 302 may be placed over both components. Further, rotary actuator 302 may comprise an opening, hold, or other void space at distal end 312, wherein connection rod 308 may be accessible from an area past distal end 312. For example, through the opening in rotary actuator 302, a mechanical fastener 130 may be inserted into connection rod 308.

As depicted, in some embodiments, demating assembly 300 may comprise two demating plates, including stationary plate 304 and movable plate 306. As described in greater detail below, stationary plate 304 and movable plate 306 may be placed between two connectors in an electrical connector assembly and used to demate the connectors via actuation of demating device 10. In some embodiments, and dependent on factors including, but not limited to, the dimensions of the electrical connector assemblies, the dimensions, shape, and design of stationary plate 304 and movable plate 306 may vary. By way of non-limiting example, and as depicted in FIGS. 1-3, stationary plate 304 and movable plate 306 may comprise a square geometric design having sides that are about 0.5 inches to about 2.0 inches in length. However, the geometric shapes and sizes of stationary plate 304 and movable plate 306 may vary and may be any polygonal shape, including for example, a triangle, square, pentagon, or hexagon of varying sizes and adapted for compatibility with differing sizes of electrical connector assemblies. Accordingly, because stationary plate 304 and movable plate 306 may be designed for compatibility with any conceivable design of electrical connector assemblies, stationary plate 304 and movable plate 306 may likewise comprise any combination of dimensions and geometric shapes.

Further, as depicted in the figures, each of stationary plate 304 and movable plate 306 may comprise at least one prong 320, flange, or other protrusion, which may be used for demating two connectors of an electrical connector assembly, as described in greater detail below. In some embodiments, the number and shape of prongs 320 may vary, and may be dependent on the shape and design of the applicable electrical connector assembly. As depicted in FIG. 1, each prong 320 may comprise a generally forked design, comprising two endpoints 340 extending outwardly with a recessed portion therebetween. However, it will be appreciated that the design of prongs 320 may vary and may be dependent on the dimensions of specific electrical connector assemblies. For example, in some embodiments, prong 320 may comprise a single endpoint 340. In further embodiments, prong 320 may comprise three endpoints 340. Additionally, the design of prongs 320 may likewise be dependent on the design of one or more electrical connector assemblies. In some embodiments, the angle that endpoints 340 extend outwardly may vary, and for example, may extend at an angle of about zero degrees to about ninety degrees. However, it will be appreciated that the angle that endpoints 340 extend may vary, and endpoints 340 may extend at any angle. Additionally, in some embodiments the size of prongs 320 may vary depending on factors such as the dimensions of the electrical connector assemblies, and for example, prongs 320 may be about 0.1 inches in length to about 0.2 inches in length.

Further, in some embodiments, each of stationary plate 304 and movable plate 306 may comprise prongs 320 having uniform dimensions, such that each prong 320 is equivalent to every other prong 320. However, in further embodiments, each of stationary plate 304 and movable plate 306 may comprise prongs 320 of varying, or non-uniform dimensions or shapes. For example, in some embodiments, stationary plate 304 and movable plate 306 may comprise a pentagonal geometric shape and further comprise five prongs corresponding to each corner. In some embodiments, the prongs 320 may comprise varying lengths, providing for multiple configurations for demating different sized electrical connector assemblies. In some embodiments, the prongs 320 may comprise varying shapes or designs of endpoints 340. By way of non-limiting, FIG. 1 depicts an exemplary embodiment of demating plates, wherein each of the demating plates may comprise eight prongs 320, with two sets of prongs 320 corresponding to each corner of the square demating plates. In another example, and as depicted in FIG. 3, in some embodiments each of the demating plates may comprise five prongs 320, with a prong 320 corresponding to each point of the pentagonal demating plates.

In some embodiments, the plates 304, 306 of demating assembly 300 may be configured for compatibility with one or multiple styles or designs of electrical connectors. For example, the geometric shape of the plates 304, 306 may correspond to one or more sizes or shapes of connectors. Additionally, the size, design, and/or placement of prongs 320 may also be selectively chosen to correspond to one or more sizes or shapes of connectors. Additionally, the plates 304, 306 may be designed such that each side of the plates 304, 306 is configured to match the size/shape of a different connector. For example, the location of prongs 320 may be variable on each side of plates 304 and 306, with each side having a different placement and/or location of the prongs. Thus, one set of plates having four sides may be designed to fit four different electrical connectors. Accordingly, one set of plates having five sides may be designed to fit five different electrical connectors.

In some embodiments, rotary actuator 302 and connection rod 308 may provide an attachment and securement means for stationary plate 304 and/or movable plate 306. For example, as depicted in FIGS. 1-3, movable plate 306 may be positioned adjacent to upright portion 220 and against spring plunger 226 of plate housing 212, or in other words, at the most distal end of demating device 10, but proximal to stationary plate 304. With movable plate 306 positioned, one or more mechanical fasteners 130 may be used to attach and secure movable plate 306 to distal end 312 of rotary actuator 302. For example, a plurality of mechanical fasteners 130 may be inserted through movable plate 306 into distal end 312 in a surrounding manner around connection rod 308. In some embodiments, the mechanical fasteners 130 may be inserted through pre-manufactured or pre-drilled openings in movable plate 306 and/or rotary actuator 302. Further, in some embodiments, mechanical fasteners 130 may be configured for selective removing, which may aid in replacing or swapping out different embodiments of movable plate 306, providing for a customizable nature to demating device 10.

In some embodiments, after the placement of movable plate 306, stationary plate 304 may be positioned for attachment. For example, stationary plate 304 may be placed and positioned against movable plate 306 and centered with a center point of stationary plate 304 matching the placement of connection rod 308. After placement, a mechanical fastener 130, may be inserted through stationary plate 304 and into connection rod 308. Similar to the method described above, mechanical fasteners 130 may be inserted through pre-manufactured or pre-drilled openings in stationary plate 304 and/or connection rod 308 which may aid in replacing or swapping out different embodiments of stationary plate 304. In some embodiments, mechanical fasteners 130 may be coupled with a smooth bored outer ring which may allow stationary plate 304 to rotate in position while secured to connection rod 308.

As described above, in some embodiments only movable plate 306 may be directly coupled to rotary actuator 302. Accordingly, when rotary actuator 302 is manipulated and rotated, only movable plate 306 will rotate. However, in some embodiments, stationary plate 304 and movable plate 306 may be coupled together such that stationary plate 304 may rotate with movable plate 306 in response to manipulation of rotary actuator 302. For example, at least one rotational pin 322 may be inserted through each of stationary plate 304 and movable plate 306, thereby coupling or joining the two plates together, as seen in FIG. 1. In some embodiments, a plurality of rotational pins 322 may be implemented. In some embodiments, rotational pins 322 may be inserted through pre-made or pre-manufactured holes or void spaces located within stationary plate 304 and movable plate 306. Further, the pre-made or pre-manufactured holes or void spaces may be sized slightly larger than the dimensions of the rotational pins 322, providing for a near interference fit. Accordingly, when rotary actuator 302 is manipulated and rotated, thereby rotating movable plate 306, pressure may be applied to the rotational pins 322 against the wall of the hole or void space each rotational pin 322 is placed in. The pressure may be dispersed across the entire length of rotational pin 322 and applied against stationary plate 304. Accordingly, as movable plate 306 rotates, the pressure transferred from rotational pin 322 causes stationary plate 304 to rotate in a corresponding fashion. Further, through a smooth bored outer ring, stationary plate 304 may rotate without de-threading or coming loose from connection rod 308. The position of each rotational pin 322 may vary, depending on the size, shape, and/or dimensions of each of stationary plate 304 and movable plate 306. For example, in an embodiment in which stationary plate 304 and movable plate 306 are square in shape, four rotational pins 322 may be equidistant apart and spaced to match the square shape of stationary plate 304 and movable plate 306, as seen in FIG. 1.

In some embodiments, the lengths of rotational pins 322 may be variable but may comprise a maximum length such that rotational pins 322 are flush with stationary plate 304 and movable plate 306. This may aid in ensuring that rotational pins 322 will not adversely effect the demating process. Further, rotational pins 322 may comprise a length so that when stationary plate 304 and movable plate 306 are spaced at a maximum distance apart, rotational pins 322 will be at least partially retained within the dimensions of stationary plate 304 and movable plate 306. This may aid in ensuring that rotational pins 322 will not become dislodged or completely removed from stationary plate 304 and movable plate 306.

In some embodiments, demating device 10 may be actuated to demate an electrical connector assembly, wherein movable plate 306 may be moved away from stationary plate 304 corresponding to a squeeze of trigger 202 and movement of drive assembly rod 208 within drive assembly rod channel 114. For example, in response to a squeeze of trigger 202 and the movement of drive assembly rod 208, plate housing 212 may likewise be moved towards the proximal end of demating device 10. During this movement, plate housing 212 may press against rotary actuator 302, thereby moving rotary actuator 302 towards the proximal end of demating device 10. Accordingly, because movable plate 306 is coupled to rotary actuator 302, movable plate 306 may also begin to move along with plate housing 212 and rotary actuator 302. Because stationary plate 304 is coupled to connection rod 308, and because connection rod 308 is coupled to housing body 100 and is immovable, stationary plate 304 may remain in place during actuation. Accordingly, with each squeeze of trigger 202, movable plate 306 may separate further and further away from stationary plate 304. The movement between the plates may be parallel in nature, which as described in greater detail below, prevents strain or damage to pins of an electrical connector assembly. Further, similar to drive assembly spring 206 as described above, with each squeeze of trigger 202, rotary actuator 302 may press against demating assembly spring 310. As this occurs, force may be stored in demating assembly spring 310 that upon release, aids in returning rotary actuator 302 and plate housing 212 to their original positions.

Figure 4:
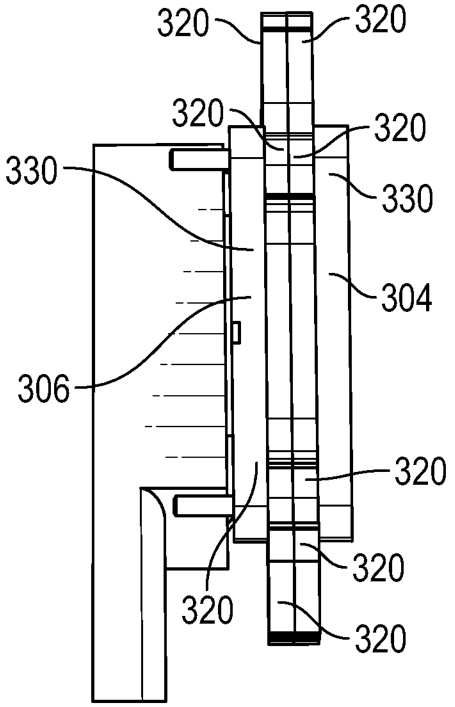
FIG. 4, is a magnified view of a stationary demating plate and a movable demating plate in accordance with some embodiments.
Figure 5:
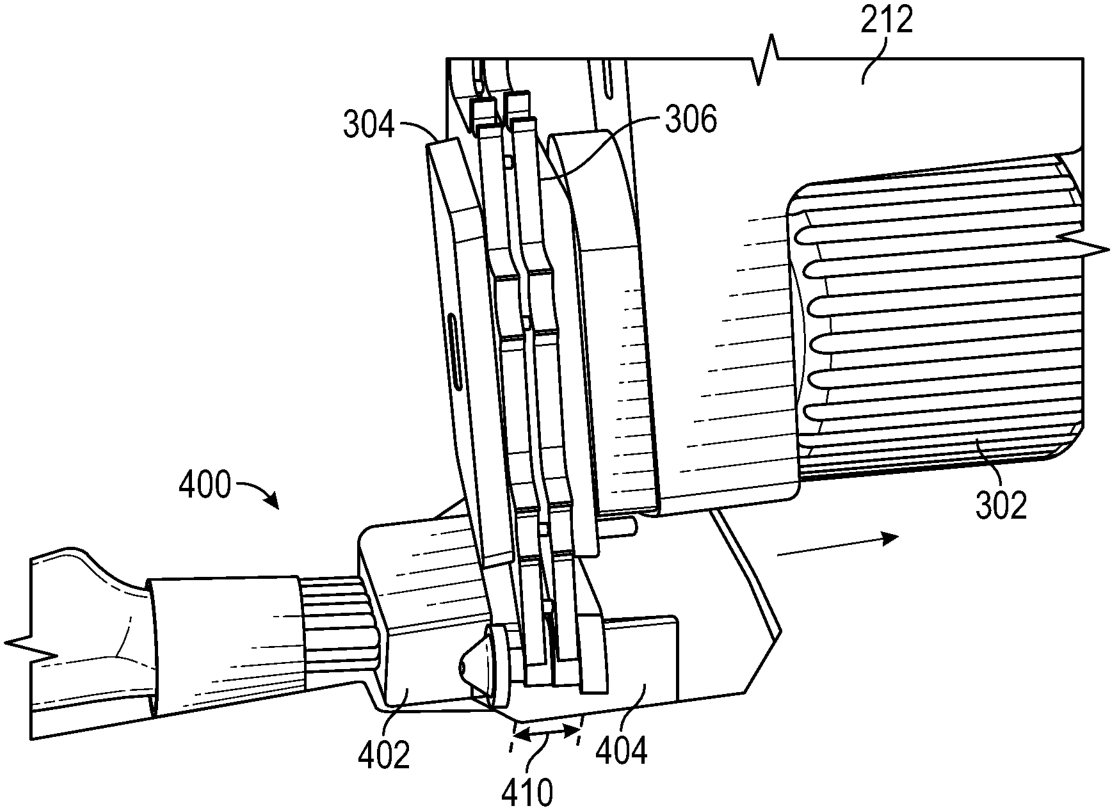
FIG. 5 is a depiction of a demating device in use, demating an electrical connector assembly, in accordance with some embodiments.

Turning to FIG. 4, in some embodiments, stationary plate 304 and/or movable plate 306 may comprise varying, or otherwise non-uniform thicknesses, which may aid in increasing the strength of the demating plates without reducing the effectiveness of the demating capabilities of demating device 10. For example, as depicted in FIG. 4, each of stationary plate 304 and movable plate 306 may comprise a raised region 330. In some embodiments, raised region 330 may be designed to correspond to the geometric shape of each of stationary plate 304 and movable plate 306. For example, in the illustrated embodiment, each of stationary plate 304 and movable plate 306 may comprise a generally square geometric design and shape. Accordingly, raised regions 330 may also comprise a generally square geometric design, generally matching the shape of the demating plates. By way of illustrative example, in embodiments in which stationary plate 304 and movable plate 306 comprise a pentagonal shape, raised regions 330 may correspondingly comprise a generally pentagonal shape. Further, the dimensions of raised region 330 may vary, depending on numerous factors, including but not limited to, the size, shape, and/or dimensions of the electrical connector assemblies, the dimensions of raised region 330 may cover or comprise a pre-determined area of each of stationary plate 304 and movable plate 306. For example, in some embodiments, raised region 330 may constitute about 25% to about 75% of the surface area of each of stationary plate 304 and/or movable plate 306. Further, the thickness of raised region 330 may also vary, and may be dependent on factors including, but not limited to, the material of stationary plate 304 and movable plate 306, raised region 330 may have a thickness of about 0.1 mm to about 0.5 mm. However, the thickness of raised region 330 may be less than or greater than the sizes disclosed herein.

Turning now to FIG. 5, an exemplary embodiment of demating device 10 is depicted in use, demating an electrical connector assembly 400, with electrical connector assembly 400 being one commonly known in the art. In some embodiments, the electrical connector assembly 400 may include a first connector 402 and a second connector 404. For example, first connector 402 may be a male plug and second connector 404 may be a female receptacle. For example, first connector 402 may comprise five pins that are inserted into five matching receptacles located in second connector 404. Further, in some embodiments, the first connector 402 and the second connector 404 may comprise a shell that house and protect the pins and receptacles. Further, a space 410 may be present between first connector 402 and second connector 404, such as a spacing between the shell of first connector 402 and the shell of second connector 404.

In some embodiments, measurements or review of electrical connector assembly 400 may occur and corresponding stationary plate 304 and movable plate 306 may be selected and attached to demating device 10. Further, in addition to selection of the right size and shape stationary plate 304 and movable plate 306, the demating plates may be rotated or otherwise indexed in a matching orientation to electrical connector assembly 400. After placement of demating device 10, actuation of demating device 10 may occur. For example, actuation may occur when handle 110 is squeezed, activating the mechanism of drive assembly 200 in the manner as described above. Accordingly, upon each squeeze of handle 110, movable plate 306 may move away from stationary plate 304 and towards the proximal end of demating device 10. For example, each squeeze of handle 110 may cause movable plate 306 to move about 0.15 inches. However, as described above, the distance that movable plate 306 may move may be variable. Upon each squeeze of trigger 202 and the movement of movable plate 306 away from stationary plate 304, first connector 402 may begin to separate from second connector 404. Because of the parallel positioning of stationary plate 304 and movable plate 306, and the generally longitudinal movement of movable plate 306, first connector 402 and second connector 404 may be demated in a stabilized manner, preventing twisting or rotating electrical connector assembly 400.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A demating device configured to separate a first connector and a second connector of an electrical connector assembly, the demating device comprising:

a housing body;

a drive assembly comprising: a drive lever, a trigger configured to push against the drive lever, a drive assembly rod, and a spring mounted around the drive assembly rod; and a demating assembly comprising:

a longitudinal movable plate having a first side and a second side, wherein each of the first side and the second side includes at least one prong configured to engage the first connector or the second connector; and a stationary plate having a first side and a second side, wherein each of the first side and the second side includes at least one prong configured to engage the first connector or the second connector; and a rotary actuator configured to rotate the movable plate and the stationary plate, and wherein the drive assembly is configured to move the movable plate away from the stationary plate in a first longitudinal direction.

2. The demating device of claim 1, wherein the first side of the movable plate comprises a first prong configuration, and the second side of the movable plate comprises a second prong configuration, wherein the first prong configuration and the second prong configuration are different.

3. The demating device of claim 2, wherein the first side of the stationary plate comprises a third prong configuration, and the second side of the stationary plate comprises a fourth prong configuration, wherein the third prong configuration and the fourth prong configuration are different.

4. The demating device of claim 3, wherein the first prong configuration is compatible with the third prong configuration and the second prong configuration is compatible with the fourth prong configuration.

5. The demating device of claim 3, wherein the first prong configuration and the second prong configuration are configured to fit different electrical connector assemblies.

6. The demating device of claim 1, further comprising a coupling pin connecting and aligning the movable plate and the stationary plate together.

7. The demating device of claim 1, wherein each of the movable plate and the stationary plate are non-uniform in thickness and further include a raised portion.

8. A demating system configured to separate a first connector and a second connector of a first electrical connector assembly, or configured to separate a third connector and a fourth connector of a second electrical connector assembly, the demating system comprising:

a housing body;

a drive assembly comprising: a drive lever, a trigger configured to push against the drive lever, a drive assembly rod, and a spring mounted around the drive assembly rod; and a demating assembly comprising:

a first set of removably attachable demating plates, comprising:

a first movable plate having at least two prongs configured to engage the first connector or the second connector, and a first stationary plate having at least two prongs configured to engage the first connector or the second connector; and a second set of removably attachable demating plates, comprising:

a second movable plate having at least two prongs configured to engage the third connector or the fourth connector, and a second stationary plate having at least two prongs configured to engage the third connector or the fourth connector, wherein the demating assembly is configured to accept the first set of removably attachable demating plates or the second set of removably attachable demating plates at one time, and wherein the drive assembly is configured to move the first movable plate away from the first stationary plate in a first longitudinal direction, and to move the second movable plate away from the second stationary plate in the first longitudinal direction.

9. The demating system of claim 8, wherein each of the first movable plate and the first stationary plate comprise a generally square perimeter.

10. The demating system of claim 9, wherein each of the first stationary plate and the first movable plate comprise eight demating prongs.

11. The demating system of claim 8, wherein each of the second movable plate and the second stationary plate comprise a generally pentagonal perimeter.

12. The demating system of claim 11, wherein each of the second movable plate and the second stationary plate comprise five demating prongs.

13. The demating system of claim 8, further comprising a rotary actuator coupled to the first set of removably attachable demating plates and the second set of removably attachable demating plates.

14. The demating system of claim 8, wherein a first side of the first movable plate comprises a first prong configuration, and a second side of the first movable plate comprises a second prong configuration, wherein the first prong configuration and the second prong configuration are different.

* * * * *